United States Patent
Yeh

(10) Patent No.: US 6,234,435 B1
(45) Date of Patent: May 22, 2001

(54) SUCKING DISK SUPPORT

(76) Inventor: Ta Kuang Yeh, No. 21, Alley 9, Lane 27, Sec. 5, Min Sheng E. Rd., Taipei (TW)

( * ) Notice: Subject to any disclaimer, the term of this patent is extended or adjusted under 35 U.S.C. 154(b) by 0 days.

(21) Appl. No.: 09/419,001

(22) Filed: Oct. 13, 1999

(51) Int. Cl.[7] ............................................. A45D 42/14
(52) U.S. Cl. ........................ 248/205.5; 248/205.8; 248/363; 248/683
(58) Field of Search ............................. 248/205.5, 683, 248/205.9, 205.8, 206.1, 362, 363, 685

(56) References Cited

U.S. PATENT DOCUMENTS

| | | | |
|---|---|---|---|
| 3,020,017 | * | 2/1962 | Watson ............................. 248/205.5 |
| 3,082,988 | * | 3/1963 | Holden ............................. 248/205.5 |
| 3,649,069 | * | 3/1972 | Zip .................................. 248/205.5 |
| 4,872,721 | * | 10/1989 | Snaiadach ....................... 248/683 |
| 5,104,077 | * | 4/1992 | Liu .................................. 248/205.8 |
| 5,423,466 | * | 6/1995 | Moon .............................. 248/205.8 |
| 5,516,019 | * | 5/1996 | Moon .............................. 248/205.5 |

* cited by examiner

*Primary Examiner*—Anita M. King
*Assistant Examiner*—Kimberly Wood
(74) *Attorney, Agent, or Firm*—Rosenberg, Klein & Lee

(57) ABSTRACT

A sucking disk support comprises a base and a sucking disk in front of the base wherein base includes a cone-shaped body with rear side attached to a sleeve. The sleeve has a front end attached to body, a central engagement portion on front end. A rear post of sucking disk is received in sleeve. Press protruded actuation member to engage head portion thereof with the rear of engagement portion such that a push forward force is exerted on sucking disk by base for pushing sucking disk to strongly adhere to a fixed object through a spring biased therebetwen.

6 Claims, 4 Drawing Sheets

SUCKING DISK SUPPORT

FIELD OF THE INVENTION

The present invention relates to a sucking disk support for holding mobile phone, tissue, soaps, towels, miscellaneous items, tumblers, cans, hooks, etc.

BACKGROUND OF THE INVENTION

Conventionally, a soap dish or item holder is fixedly attached to a wall by screw(s) or adhesive. Its main disadvantage is difficult to detach for moving to another place to reinstall once installed. In brief, it is not flexible in usage and thus sometimes causes a difficulty for user. Another conventional design is to implement a sucking disk with one end fixedly attached to soap dish or item holder and the other end adhered to a wall, glass, or any one of fixed objects. However, such adherence by sucking force is insufficient to support soap dish or item holder in most cases. Thus, it is highly possible for soap dish or item holder to separate from, for example, the wall.

SUMMARY OF THE INVENTION

Accordingly, the present invention is directed to a sucking disk support for holding, for example, a mobile phone, tissue, etc., that substantially obviates the conventional problems.

It is an object of the present invention to provide a sucking disk support comprising a base, a sucking disk, and an elastic member located between base and sucking disk. The elastic member is biased when body member of base is engaged against sucking disk such that elastic member can push sucking disk to strongly adhere to a fixed object by biasing elastic member between base and sucking disk for preventing bringing about a separation between sucking disk and fixed object.

The above and other objects, features and advantages of the present invention will become apparent from the following detailed description taken with the accompanying drawings.

DETAILED DESCRIPTION OF THE PREFERRED EMBODIMENTS

Figure 1:
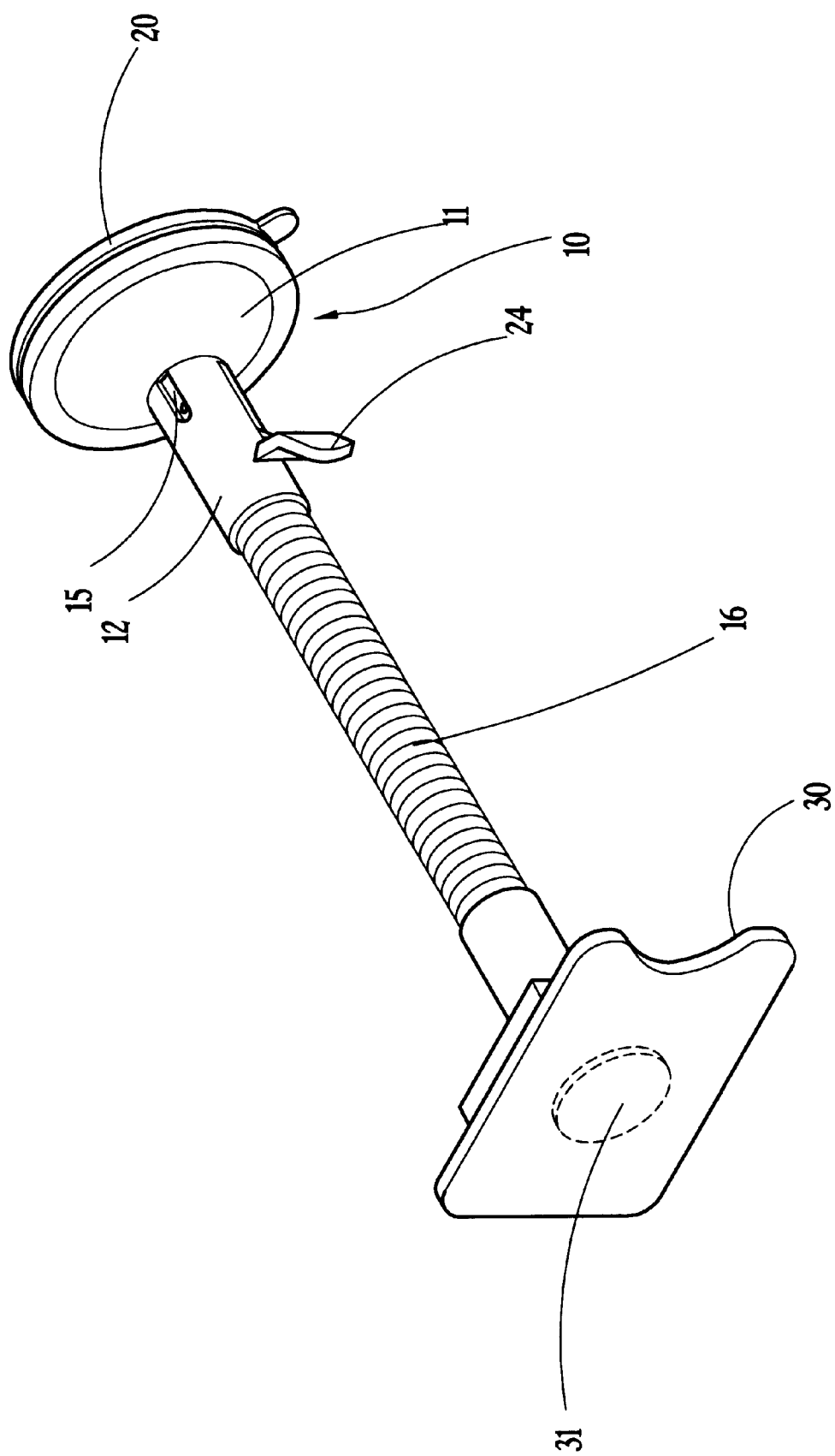
FIG. 1 is a perspective view of an embodiment of sucking disk support of the present invention.
Figure 2:
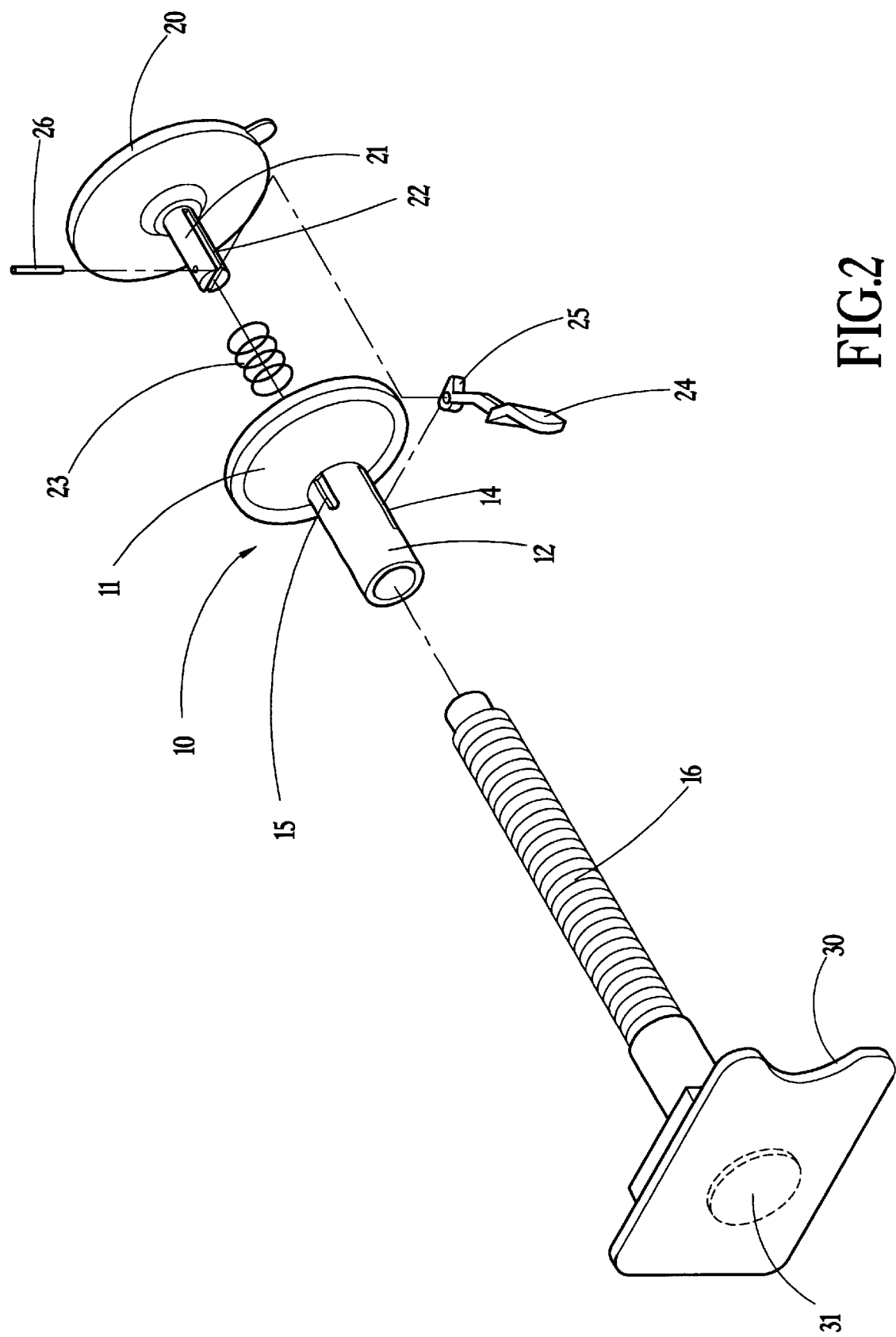
FIG. 2 is an exploded view of FIG. 1.
Figure 3:
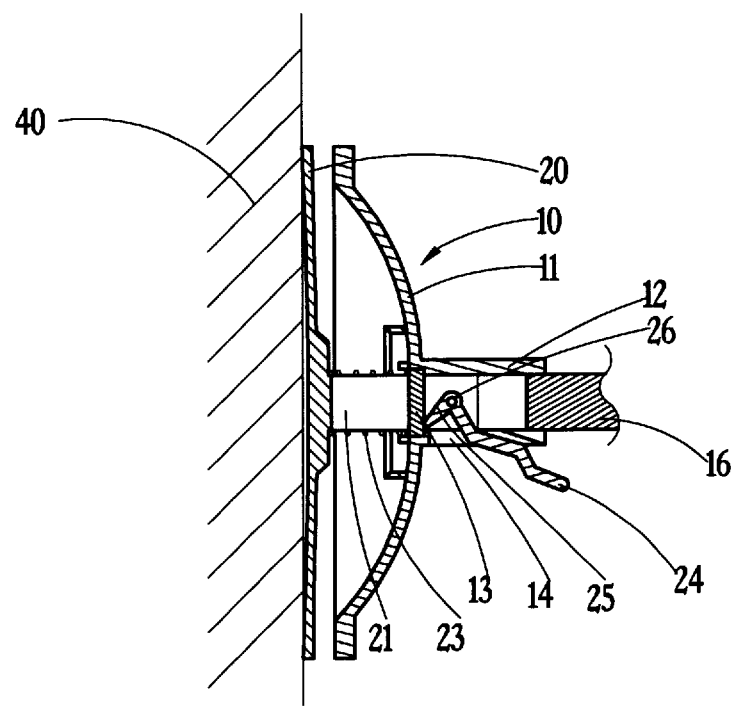
FIG. 3 is a cross-sectional view of the main portion of the present invention shown in FIG. 1 in which sucking disk is attached to a fixed object, while body member is not engaged with sucking disk.

Referring to FIGS. 1–3, there is shown a sucking disk support constructed in accordance with the present invention comprising a base 10 and a sucking disk 20 wherein base 10 includes a generally cone-shaped body member 11 with rear side attached to a hollow cylindrical member 12. The cylindrical member 12 has a front end attached to body member 11, a central engagement portion 13 on front end, a first elongate aperture 14 on the cylindrical outer surface attached to engagement portion 13, and at least one second elongate apertures 15 on the cylindrical outer surface shorter than the first elongate aperture 14. Sucking disk 20 is made of a plastic material such as rubber or the like. Sucking disk 20 is provided in front of body member 11 of base 10 having a rear post 21 protruded from the center portion. Post 21 has a groove 22 cut through from top to bottom thereof.

In assembly, first put an elastic member (e.g., coil spring) 23 on post 21. Then insert post 21 through engagement portion 13 to be received in cylindrical member 12 such that elastic member 23 is located between sucking disk 20 and base 10. Insert head portion 25 of an actuation member 24 through first elongate aperture 14 to engage with the rear of engagement portion 13. Finally, insert a locking pin 26 through second elongate aperture 25, post 21, and a hole of head portion 25 of actuation member 24 so as to allow actuation member 24 to pivot about pin 26 to complete the sucking disk support.

Figure 4:
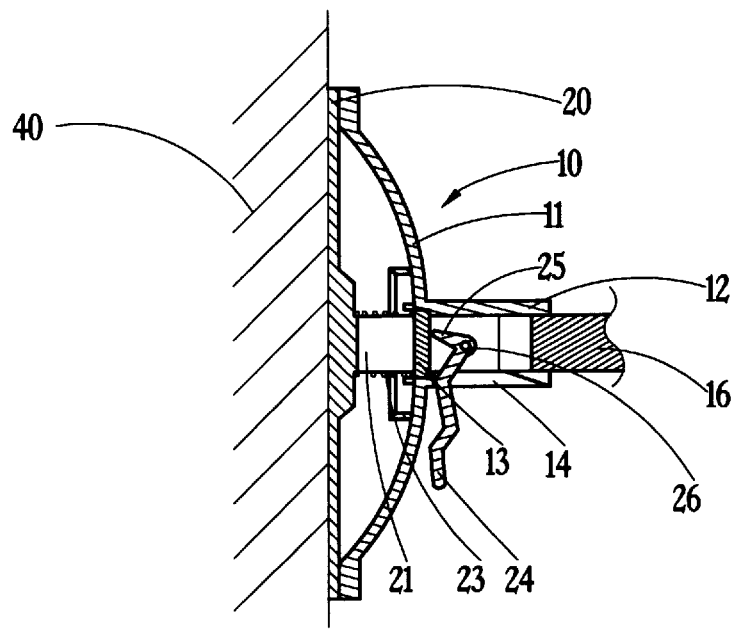
FIG. 4 is a view similar to FIG. 3 in which body member is engaged with sucking disk.

FIGS. 3–4, illustrate how to suck sucking disk 20 onto a fixed object 40, for example, a tile or a piece of glass. Press actuation member 24 to engage head portion 25 of actuation member 24 with the rear of engagement portion 13 such that a push forward force is exerted on sucking disk 20 by base 10, i.e., body member 11 of base 10 is engaged against sucking disk 20 for pushing sucking disk 20 to strongly adhere to fixed object 40. The provision of elastic member 23 between base 10 and sucking disk 20 has the function as detailed below. Elastic member 23 is biased when body member 11 of base 10 is engaged against sucking disk 20 such that elastic member 23 can push sucking disk 20 to strongly adhere to fixed object 40 by biasing elastic member 23 between base 10 and sucking disk 20 for preventing bringing about a separation between sucking disk 20 and fixed object 40.

In the embodiment shown in FIGS. 1–2, base 10 is attached to a vehicle cradle 30 through a connection rod 16 for supporting a mobile phone (not shown). In detail, vehicle cradle 30, having a mobile phone with its cells in the back battery compartment magnetically attracted by a magnet 31 and firmly supported thereon, is attached to a smooth fixed object such as a piece of glass window of car by the attached sucking disk 20.

Figure 5:
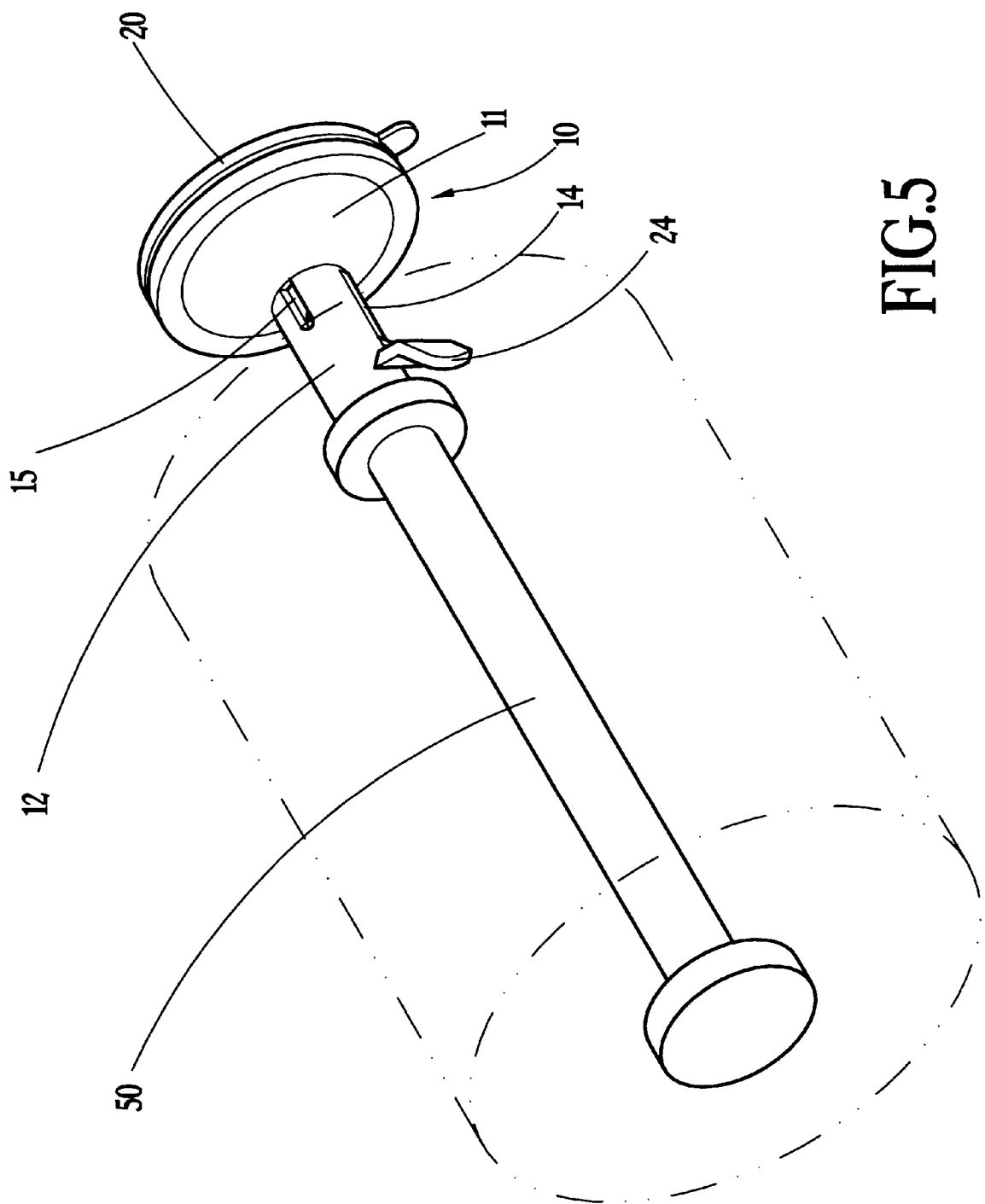
FIG. 5 is a perspective view of another embodiment of sucking disk support of the present invention.

In another embodiment shown in FIG. 5, base 10 is attached to a tissue holder 50 such that tissue holder 50 may be secured by adhering sucking disk 20 to a wall, a piece of glass, or any fixed object in the kitchen or bathroom. It is readily appreciated by those skilled in the art that base 10 may attach to many suitable objects such as soap dish, towel bar, tumbler holder, miscellaneous items holder, hook, etc.

While the invention herein disclosed has been described by means of specific embodiments, numerous modifications and variations could be made thereto by those skilled in the art without departing from the scope of the invention set forth in the claims.

What is claimed is:

1. A sucking disk support comprising:

a base including a body with a rear side attached to a sleeve, the sleeve having a front end attached to the body, a first elongate aperture on cylindrical outer surface, and a central engagement portion on the front end;

a sucking disk provided in front of the base including a rear post being inserted into the sleeve through the central engagement portion and an elastic member provided between the base and the sucking disk; and an actuation member having a head portion pivotally fixed in the sleeve and an end portion protruded from the first elongate aperture of the sleeve;

wherein press the protruded end portion of the actuation member to engage the head portion thereof with the engagement portion such that a push forward force is exerted on the sucking disk by the base for pushing the sucking disk to adhere to a predetermined member.

2. The sucking disk support of claim 1, wherein the body of the base is of cone shape.

3. The sucking disk support of claim 1, wherein the fist elongate aperture is attached to the engagement portion.

4. The sucking disk support of claim 1, wherein the sleeve comprises at least one second elongate apertures on the cylindrical outer surface for allowing a locking pin to penetrate through the second elongate aperture, the rear post, and the head portion of the actuation member.

5. The sucking disk support of claim 1, wherein the elastic member is put on the rear post of the sucking disk.

6. The sucking disk support of claim 1, wherein the rear post has a groove cut through from a top to a bottom thereof being attached to the engagement portion.

* * * * *